United States Patent [19]

Danino

[11] Patent Number: 5,233,275
[45] Date of Patent: Aug. 3, 1993

[54] SIMPLIFIED SENSORLESS DC MOTOR COMMUTATION CONTROL CIRCUIT USING ANALOG TIMING TECHNIQUES

[75] Inventor: Eli Danino, Northridge, Calif.

[73] Assignee: Micropolis Corporation, Chatsworth, Calif.

[21] Appl. No.: 786,378

[22] Filed: Nov. 1, 1991

[51] Int. Cl.$^5$ .............................................. H02P 7/00
[52] U.S. Cl. .................................. 318/254; 318/439; 318/138
[58] Field of Search ............... 318/138, 439, 254, 805, 318/806, 808, 812; 388/928.1

[56] References Cited

U.S. PATENT DOCUMENTS

| | | | |
|---|---|---|---|
| 4,585,982 | 4/1986 | Cooper et al. | 318/723 |
| 4,743,815 | 5/1988 | Gee et al. | 318/254 |
| 4,833,386 | 5/1989 | Unsworth | 318/763 |
| 4,874,993 | 10/1989 | Tanaka et al. | 318/254 |
| 4,876,491 | 10/1989 | Squires et al. | 318/138 |
| 5,014,756 | 5/1991 | Schwarz | 318/254 |
| 5,057,753 | 10/1991 | Leuthold et al. | 318/254 |

Primary Examiner—Jonathan Wysocki
Attorney, Agent, or Firm—Poms, Smith, Lande & Rose

[57] ABSTRACT

Initial start-up of a polyphase, brushless DC motor (used for a hard disk drive system) is accomplished by sequentially applying current to each of the phases of the motor. When a back EMF zero-crossing is detected in one of the phases of the motor, after an appropriate delay to allow the next phase to come into position, current is applied to that phase. Thus, the position of the rotor is determined from the back EMF zero-crossing of the phase to which power is currently being supplied. A delay proportional to the speed of the motor is used between the detection of a back EMF zero-crossing and the powering of the next phase in sequence. A disk drive motor is brought up to its operating speed of 3600 or 5400 rpm's in successive stages with (1) an initial relatively slow energization of the stator coils (2) zero-crossing detection with a relatively long delay and masking of spurious signals, (3) zero-crossing detection with shorter delay and masking times, and (4) maintaining the rotational speed of disks at the appropriate operating speed using any of various methods commonly known and employed by those of ordinary skill.

5 Claims, 6 Drawing Sheets

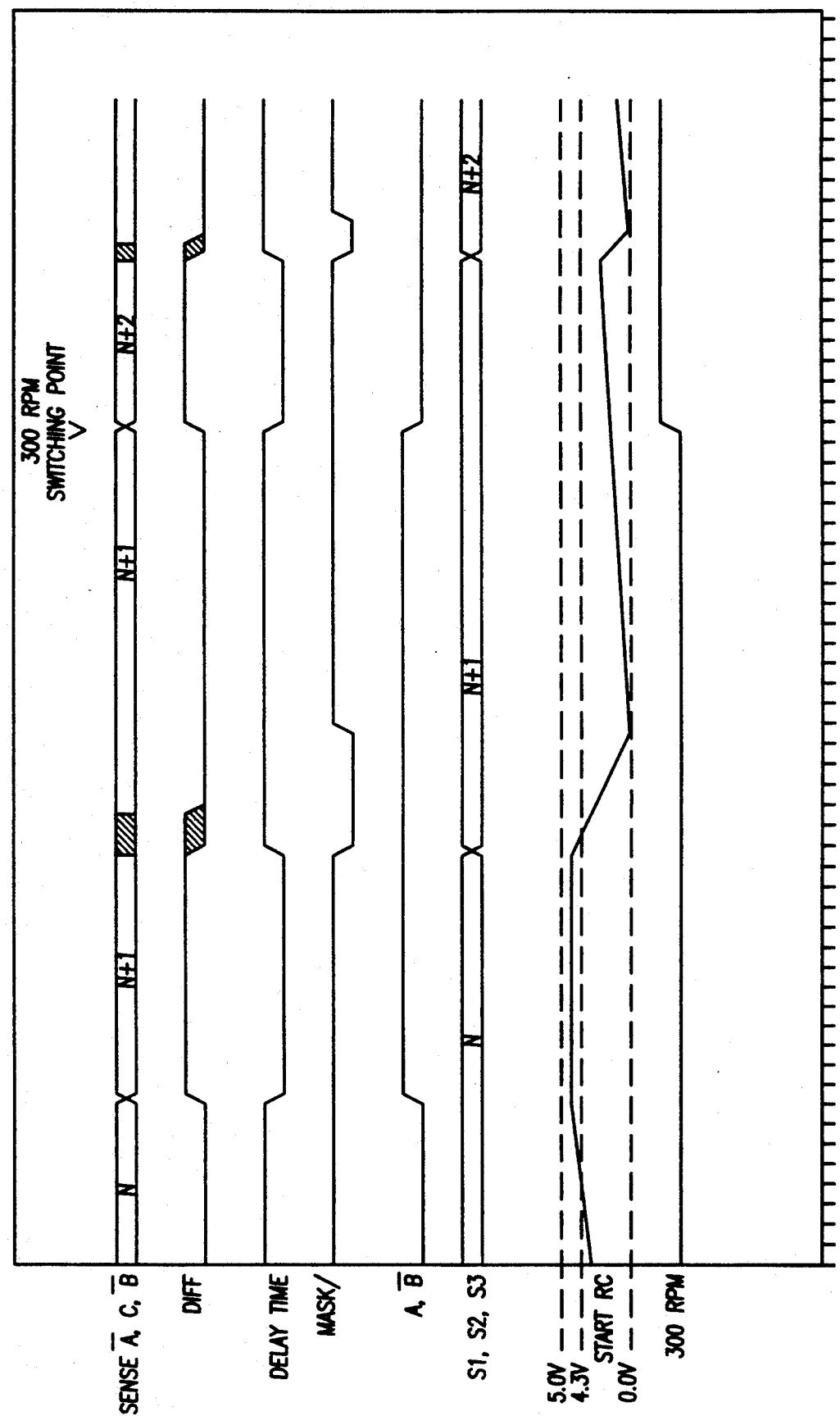

SIMPLIFIED SENSORLESS DC MOTOR COMMUTATION CONTROL CIRCUIT USING ANALOG TIMING TECHNIQUES

BACKGROUND OF THE INVENTION

The present invention relates in general to DC motors, and more particularly to control of a polyphase, brushless DC motor in a disk drive assembly used to move the disks past a read/write head.

Conventional brushless DC motors are highly efficient and possess characteristics that make them suitable for a number of applications. In particular, brushless DC motors are favored as the moving force for rotating the disk surfaces of the disks of hard disk drive systems past a read/write head.

Polyphase, brushless DC motors require application of currents to stator windings in a sequential order to produce torque inducing flux for moving a rotor. DC currents are alternately switched about the stator windings to create various current paths that produce magnetic flux orientations in a synchronized fashion. The resultant magnetic flux produces a torque on the permanent magnet rotor that causes rotational movement. In order to insure that current is applied to the most appropriate current path through the stator windings (the appropriate motor phase) to most efficiently produce the maximum torque, various schemes have been used to provide positional information about the rotor, specifically, the location of the north and south magnetic poles of the permanent magnet rotor.

One such sensing scheme utilizes Hall effect sensors. Other systems have been developed using optical sensors. One problem with these sensing schemes is that the components used in the sensing scheme are often the part of the motor that is most prone to failure, thereby significantly affecting the overall reliability of the apparatus. Additionally, incorporating the components of the sensing scheme in the motor structure itself increases the size, cost, complexity and power consumption of the motor itself.

Another system for initiating and controlling the movement of brushless DC motors in the context of a Winchester type hard disk drive is described in U.S. Pat. No. 4,876,491, issued on Oct. 24, 1989 to Squires, et al. The Squires, et al. patent describes a circuit and method for controlling a brushless DC motor which involves determining the position of the rotor by applying a high frequency current to each of the phases of the motor and then comparing the voltage produced across each phase by that current. The method and circuit described by Squires, et al., requires the use of a microprocessor which increases the cost of the unit and also places some restrictions on the responsiveness of the system because of the delays caused by the use of microprocessor.

Therefore, a significant improvement in brushless DC motor design can be achieved if positional information can be obtained without incorporating extra apparatus in the motor structure itself and without the use of a microprocessor.

SUMMARY OF THE INVENTION

Accordingly, there is disclosed here a method and apparatus for incorporating that method, for developing feedback information concerning the rotational position of the rotor of a brushless DC motor without the use of sensing devices built into the motor structure itself and without the use of a microprocessor. The method and apparatus provide a highly reliable and inexpensive feedback mechanism that allow the motor structure to be reduced in size, complexity and cost and to be quicker and more responsive than a comparable system incorporating microprocessor control.

Broadly, the invention incorporates a circuit which detects a zero-crossing of the back EMF (electro motive force) generated by any of the phases of the motor and uses that back EMF zero-crossing detection as positional information.

Initially when the motor is at rest, each of the phases of the motor are sequentially powered to initiate some movement of the rotor sufficient to create a detectable back EMF zero-crossing. A back EMF zero-crossing occurs as the permanent magnet rotor with alternate north and south poles rotates past the stator windings, and causes flux reversal in each of these windings. After the back EMF zero-crossing is detected, the system then applies current to the next appropriate motor phase as determined from the positional information derived from the detection of the back EMF zero-crossing.

When a back EMF zero-crossing is detected in the currently powered phase, the next phase is not yet in the optimum position for the application of current. Therefore, a delay must be interposed between the detection of the back EMF zero-crossing and application of commutation power to the next phase in sequence. That delay can be an average of the optimum delay across a range of motor speeds or the delay can be a portion of the time of the previous cycle.

The system can be utilized by applying the maximum current available to each phase in order to obtain the desired speed in the minimum amount of time. After the desired speed of the motor has been reached, various techniques currently used and commonly known by those skilled in the art, can be used to keep the motor at a specific speed, typically 3600 or 5400 rpm.

Thus, the system has three broad modes, the start-up mode, the zero-crossing controlled mode, and the speed maintenance mode; and the zero-crossing mode may involve different implementations or sub-modes at different speeds.

One advantage of the present invention is that it eliminates the need for sensors, such as Hall effect sensors, within the motor structure itself. The position of the rotor is determined by the back EMF zero-crossing circuit which can be located outside the motor. Another advantage of the present invention, is that a microprocessor is not needed to control the motor. The signal which is generated by the back EMF zero-crossing detector is preferably a three bit signal which indicates the next phase of the motor to which commutation power should be applied. No calculations or comparisons need to be performed by a microprocessor.

These and other advantages of the present invention will be readily evident to those skilled in this art upon a reading of the following detailed description, which should be taken in conjunction with the accompanying drawings.

BRIEF DESCRIPTION OF THE DRAWINGS

FIG. 7 is a timing diagram of the operation of the present circuitry during run mode.

DETAILED DESCRIPTION

Figure 1:
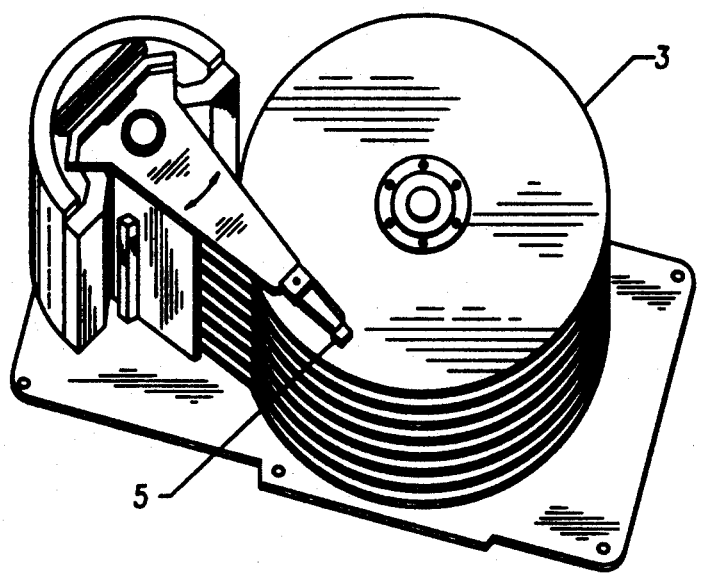
FIG. 1 shows a hard disk drive assembly.

In a particular embodiment of the present invention which is described below, the invention is used to operate a three phase (a motor having three coils or armature windings), brushless DC motor within a Winchester type disk drive as shown in FIG. 1. Reference will be made herein to six "phases" which are the positive and negative directions of current flow through the phases. As shown in FIG. 1, the disk drive typically includes disks 3, read/write heads 5, with the disks 3 attached to the rotor of the motor (not shown).

Figure 2:
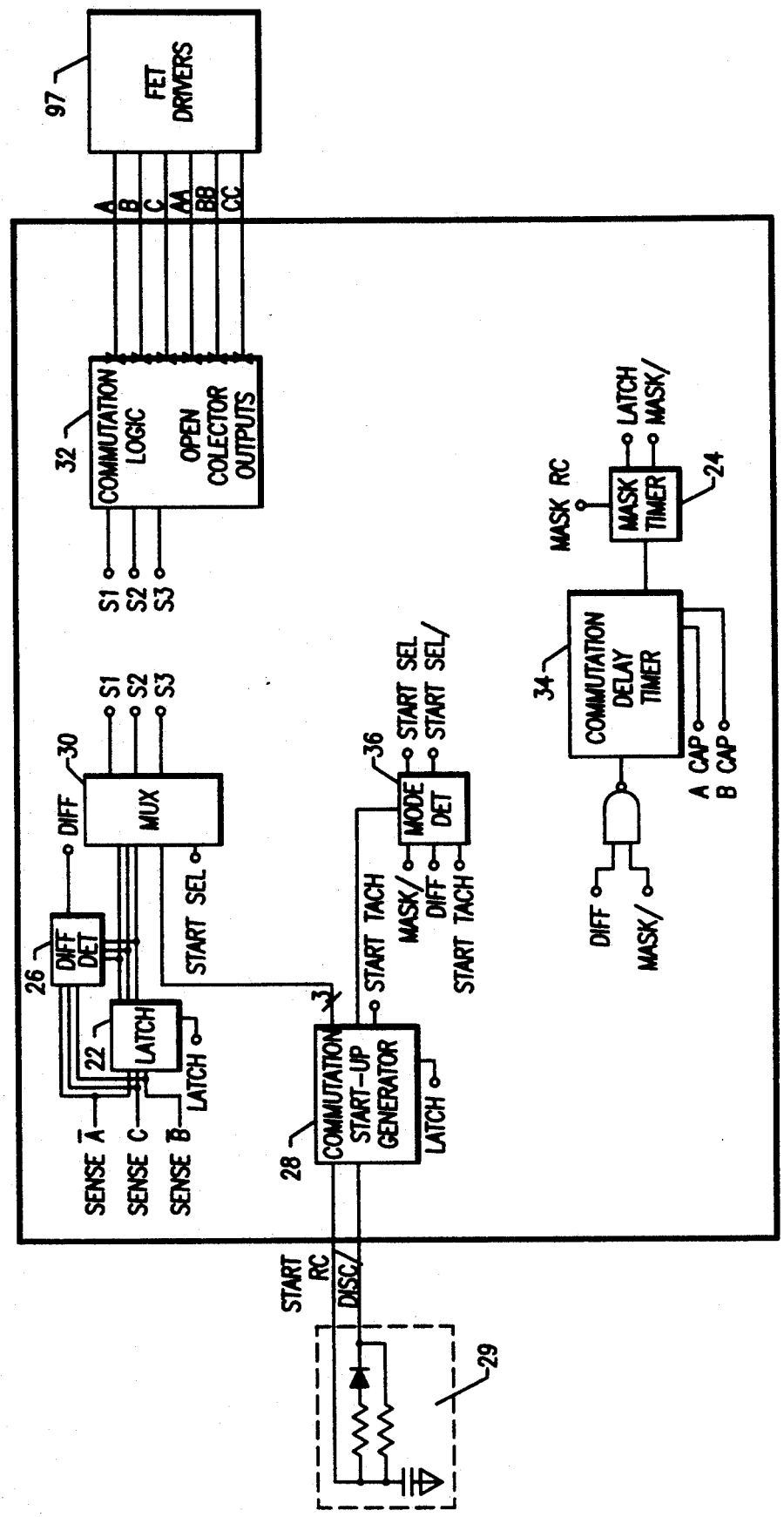
FIG. 2 is a block drawing of a circuit illustrating the principles of the present invention.

Initially, in the start-up mode, the motor is at rest and no back EMF can be detected because none is generated without movement of the permanent magnet rotor with respect to the stator coils. To initiate movement of the rotor, the maximum current available is run for 60 milliseconds through each phase of the motor in sequence. Referring to FIG. 2, initially, the start select signal is at its high level, (indicating start-up mode) which causes the multiplexor (mux) 30 to ignore the input from the latch 22 and instead accept the input from the commutation start-up generator 28 and output the set of three signals to the commutation logic 32. The output from the commutation start-up generator 28 is a parallel three bit signal generated by the flip-flops located in the commutation start-up generator 28. The three bit signal causes a sequential powering of the six motor phases in sequence with each phase lasting 60 milliseconds.

The parallel three bit signal generated by the flip-flops located in the commutation start-up generator 28 advances to the next phase every 60 milliseconds when the start RC signal reaches its 5 volt maximum, as discussed below.

Figure 6:
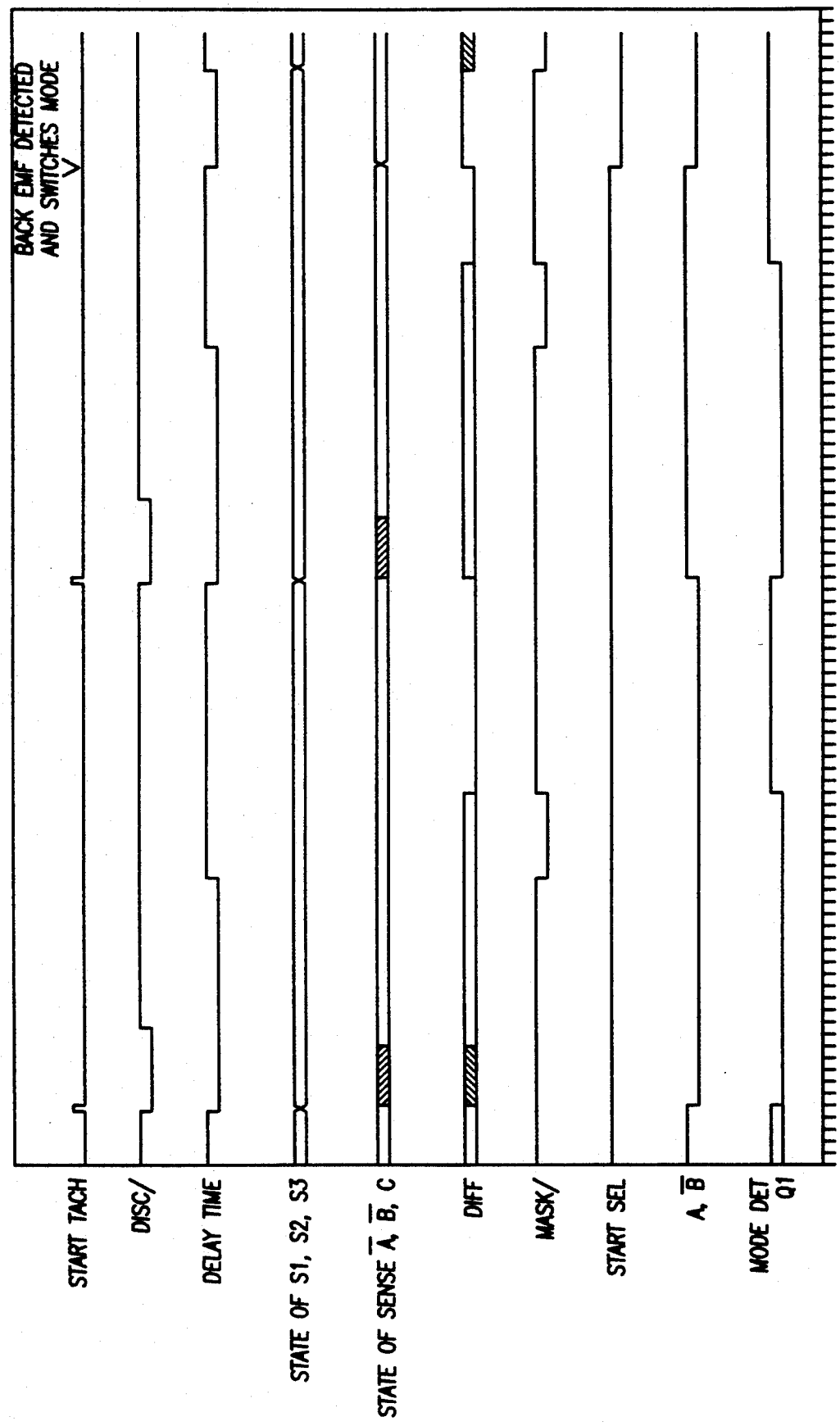
FIG. 6 is a timing diagram for the operation of circuitry implementing the present invention during start-up.

Each time the start RC signal reaches its 5 volts maximum the commutation start-up generator issues a start tach signal, see FIG. 6. The start tach signal (which indicates that no EMF zero-crossing was detected when the current phase was powered) is received by the mode detector 36 which causes the mode detector 36 to keep the start select signal at its high level (start sel/ low).

As the six phases of the motor are sequentially powered, some movement of the rotor will occur. The minimum amount of back EMF which is detectible by the back EMF detecting circuit is approximately 50 millivolts. Therefore, when movement of the rotor sufficient to create back EMF of 50 millivolts takes place, then a back EMF zero-crossing will be detected by the circuit shown in FIG. 3 and accordingly the state of the three signals sense A/, sense B/, and sense C will change, as shown in the timing diagram of FIG. 6, which are carried over as inputs to latch 22 and difference detector 26 in FIG. 2 (the back slash "/" is used to indicate "not" or logical complement).

The difference detector 26 recognizes the change in state of those three signals. The difference detector then generates a difference signal or "diff" signal, indicating a back EMF zero-crossing was detected, when a change in state of the signals sense A/, sense B/ and sense C is detected. The mode detector 36 receives the diff signal and shifts the start select signal to its low output state, indicating that the system is no longer in the start-up mode. The multiplexor 30 will then forward the signals received from the latch 22, instead of from the commutation start-up generator 28, to the commutation logic 32. The system is now in the "run mode under 300 rpm", one of the two sub-modes of the zero-crossing controlled mode.

In the "run mode below 300 rpm", the detection of a back EMF zero-crossing is the event which triggers the beginning of each cycle. When a back EMF zero-crossing is detected, the diff signal is generated by the difference detector 26. The diff signal is received by the commutation delay timer 34 where that signal and the mask/ signal are combined in the Logical And circuit 35. The commutation delay timer 34 then triggers the beginning of the delay time at the end of which the mask timer 24 shifts the mask/ signal to its low state. When the mask/ signal is low, it in effect prevents any zero-crossings from being detected or acknowledged by either the mode detector 36 or the commutation delay timer 34, as discussed further below.

The mask/ signal also initiates the rapid discharge of the capacitor in the start RC circuit 29. Along with the mask/ signal, the latch signal, which is the complement of the mask/ signal, is also generated and is sent to the latch 22. When the latch signal is in its high state, it causes the latch 22 to latch in the new state or store the values which are present at its inputs, sense A/, sense B/ and sense C. This new state of the input sense signals is then sent to the multiplexor 30 and is forwarded to the commutation logic 32 to begin sending current through the next phase in sequence as indicated by signals S1, S2 and S3. As the next phase is turned on, the mask/ signal is held low to mask out any false zero-crossings that might be caused by transient voltages during the initial powering-up of that phase and thereby preventing the generation of a false diff signal. The commutation start-up generator 28 also monitors the voltage level reached by the start RC signal. When the start RC signal begins rapidly discharging after it reaches 4.3 volts but before it reaches 5 volts, the system is operating in the "run mode below 300 rpm". When the start RC signal begins rapidly discharging before reaching 4.3 volts, the system recognizes that it is in the "run mode above 300 rpm", the second of the two sub-modes of the zero-crossing controlled mode.

The "run mode above 300 rpm" is identical to the "run mode below 300 rpm" except that the mask/ signal is pulled to its low state for a much shorter period. The mask/ signal is pulled low for a shorter period of time in "run mode above 300 rpm" because the changes from one phase to the next occur more rapidly, at the higher speeds. At higher speeds, the relatively long masking signal used during "run mode under 300 rpm" would mask out a true back EMF signal signaling a change in phase.

Once the motor reaches a predetermined running speed, commonly 3,600 rpm or 5,400 rpm, control of the energization of the motor is taken over by a different circuit. Any of the circuits commonly known and used by those of ordinary skill in the art could be utilized to maintain the motor at the desired running speed.

As discussed above, the motor is energized in successive modes, including the start-up mode, the zero-crossing controlled mode (with two sub-modes), and the conventional speed maintenance mode. The logic circuit blocks and their interconnections of an exemplary circuit incorporating the principles of the present invention are discussed below in more detail.

Again referring to FIG. 2, the commutation start-up generator 28 receives the start RC signal which is the output of the RC circuit indicated generally as 29. A comparator within the commutation start-up generator 28 compares the start RC signal with a 5 volt reference and produces the start tach signal if the start RC signal reaches the 5 volt level. The RC signal only reaches the 5 volt level when the system is in its initial start-up mode. The capacitor in the RC circuit 29 takes approximately 60 milliseconds to charge to its 5 volt level.

The commutation start-up generator 28 also includes a series of flip-flops which cycle through a parallel three bit output pattern which is output to the multiplexor (mux) 30. The three bit output pattern is output from the multiplexor 30 to the commutation logic 32 during the initial start-up mode and represents the sequential ordering of the six phases of the motor. This sequential signal indicating the six phases of the motor in sequence is used during initial start-up of the motor to cause the six phases of the motor to be energized sequentially. The commutation logic 32 sends signals to the FET (Field Effect Transistor) drivers 97 which actually control the energization of the six phases of the motor.

Figure 3:
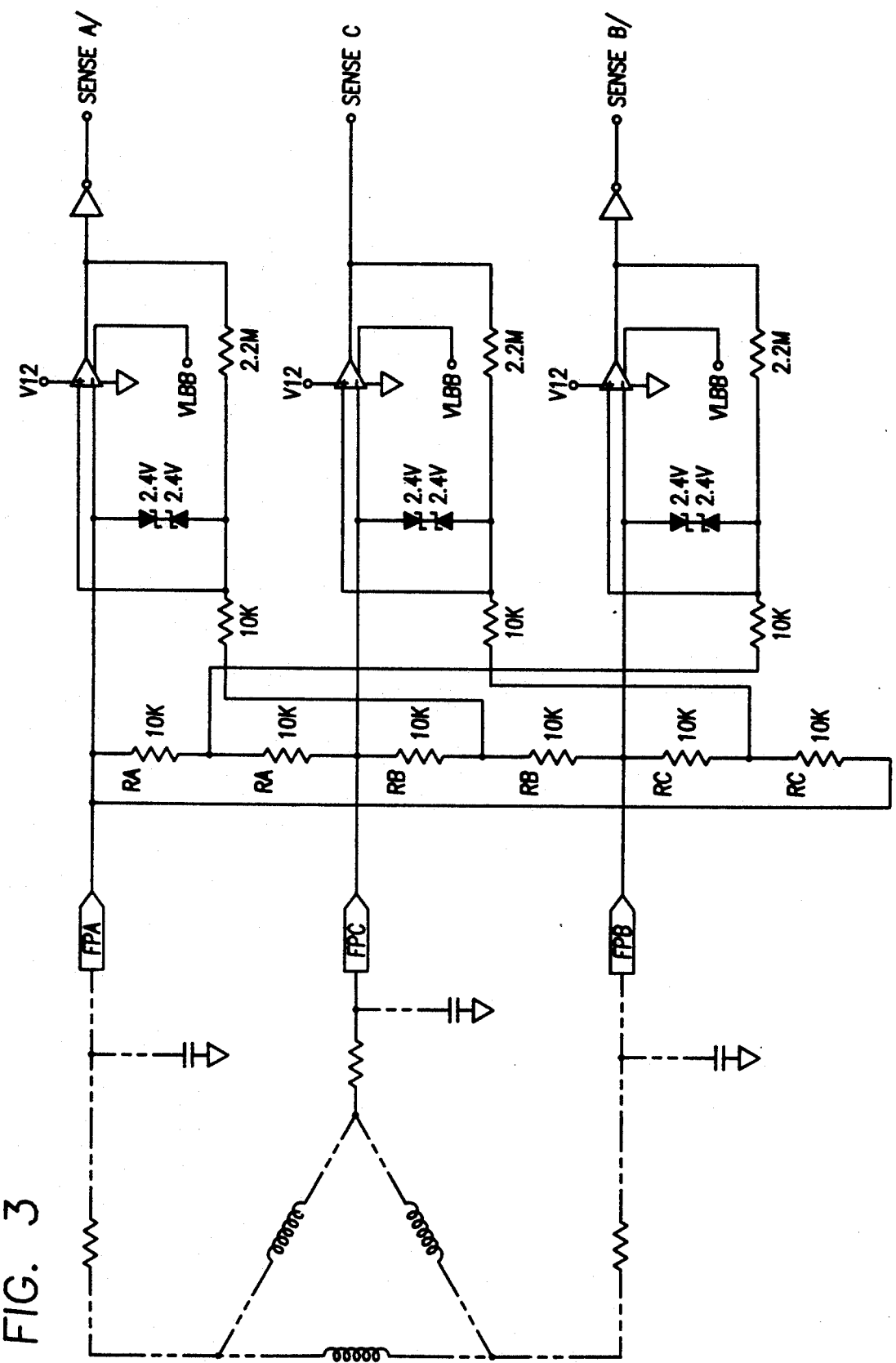
FIG. 3 is a more detailed schematic drawing of a zero-crossing detection network utilized in an implementation of the present invention.

The latch 22 stores the output of the signals sense A/, sense C, and sense B/ which are outputs from the zero-crossing detection circuit shown in FIG. 3. Those outputs are stored in the latch 22 when the latch signal is generated by the mask timer 24 which causes the latch 22 to store the valves present at its inputs or latch in the next state. The difference detector 26 (diff det) performs an Exclusive Or function of the state present in the latch 22 and the current output of the signals sense A/, sense C, and sense B/; and provides an output signal when there is any difference between the two sets of signals. In other words, the difference detector 26 produces the diff signal when a back EMF zero-crossing is detected. When such a change occurs the diff (difference) signal is generated by the difference detector 26.

The commutation delay timer 34 receives the diff signal which indicates when a zero-crossing of back EMF of one of the phases has occurred. After a delay, the commutation delay timer 34 triggers the mask timer 24 which generates the latch signal which causes the latch 22 to latch in the new values or state which is present on the sense A/, sense C and sense B/ signals. The new values then appear on lines S1, S2, S3 which run from the multiplexor 30 to the commutation logic 32.

The commutation delay timer 34 uses two capacitor (RC) circuits, indicated generally in FIG. 2 as Cap A and Cap B, as timers for determining the proper commutation delay. This circuit serves to provide energization for the next phase, following a delay equal to one-half of the energization period of the previous phase. One capacitor circuit charges as a phase is energized while the other capacitor circuit had been charged during the powering of the previous phase. The previously charged capacitor circuit discharges, preferably at twice its charge rate, when the back EMF zero-crossing is detected. The time for the discharge of the capacitor circuit provides the time for the delay.

For example, Cap A charges as current is applied to one phase. Cap B begins discharging when the back EMF zero-crossing for that one phase is detected. The end of Cap B's discharging is the end of the delay between the zero-crossing for that one phase and applying current to the next phase. Cap A stops charging when current is no longer applied to the one phase. Cap B begins charging when current is applied to the next phase. Cap A begins discharging when a zero-crossing is detected for that next phase. The discharging of Cap A then provides or times the delay between that zero-crossing and when current is applied to the next phase in sequence. The ratio of charge to discharge for Cap A and Cap B is preferably 2:1. Therefore, the delay for the current phase is one-half of the time current was applied to the previous phase. However, at slower speeds in the "run mode under 300 rpm" the delay may preferably be a preset average of the optimum delay over a range of speeds.

The mask timer 24 also generates the mask/ signal which is received by the commutation delay timer 34 causing the commutation delay timer 34 to ignore the diff signal while the next phase is first powered so that transients caused by the turning on of the phase in the motor are not mistaken for a true back EMF zero-crossing. The length of the mask period is preferably of a fixed duration timed by the discharge of an RC circuit, indicated in FIG. 2 as mask RC.

Figure 4:
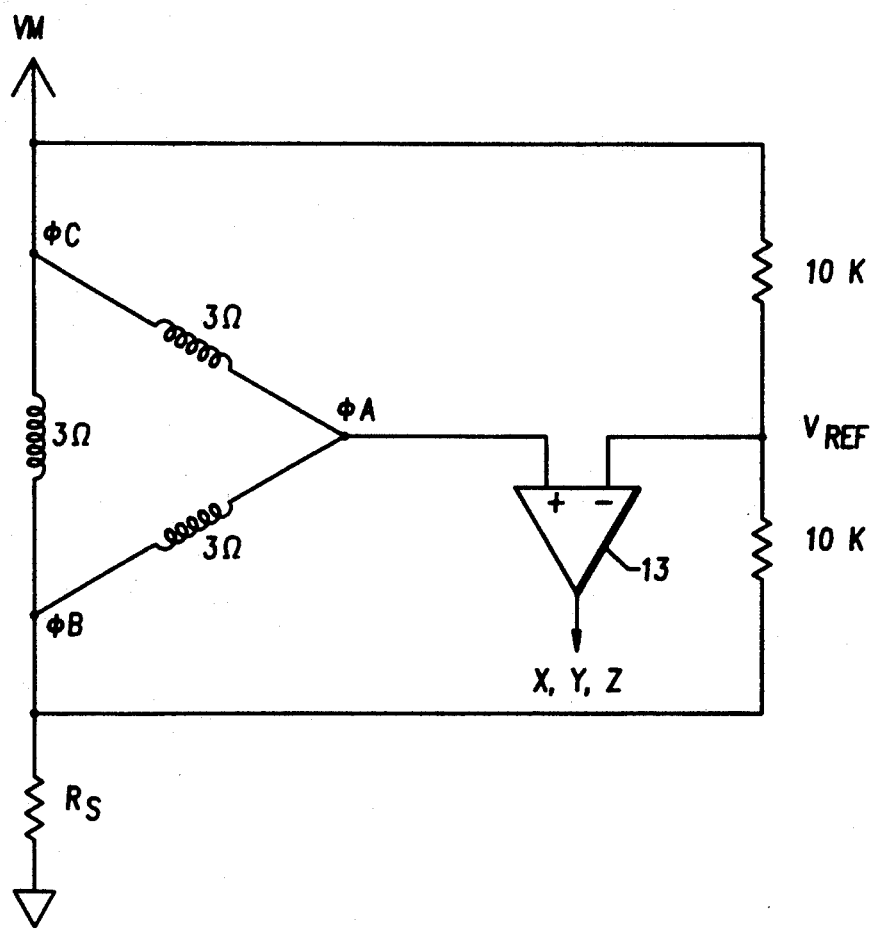
FIG. 4 is a simplified schematic drawing of an exemplary zero-crossing detector circuit.

A simplified version of the back EMF zero-crossing detector utilized in the present invention is shown in FIG. 4. A voltage $V_m$ is shown applied across the coil C potentially causing back EMF across coils B and A. The voltage $V_{ref}$ equals $V_m$ minus $V_{rs}$ (the voltage drop across the resistor $R_s$) divided by two ($V_{ref} = (V_m - V_{rs})/2$). The voltage $V_{ref}$ is used to cancel out the DC voltage present at the positive input of the comparator 13. The voltage present at the positive input to the comparator 13 is $V_m$ minus $V_{rs}$ divided by two plus the back EMF at node A ($(V_m - V_{rs})/2 + BEMF$). Therefore, the output of the comparator 13 will be high when the transient voltage, or the back EMF at the positive input to the comparator 13 is a positive voltage and the output of the comparator 13 will be low when the back EMF is a negative voltage. Because of physical limitations in the system, a zero-crossing of the back EMF signal can only be detected when a overall amplitude of the back EMF signal exceeds 50 mV.

FIG. 3 shows the actual circuit diagram for the back EMF zero-detecting circuit for all three of the motor coils. The circuit shown in FIG. 3 is constructed so that a back EMF zero-crossing in one phase generates a three bit signal which is the three bit signal the commutation logic 32 interprets as the next sequential phase from the phase in which the back EMF zero-crossing occurred.

Figure 5:
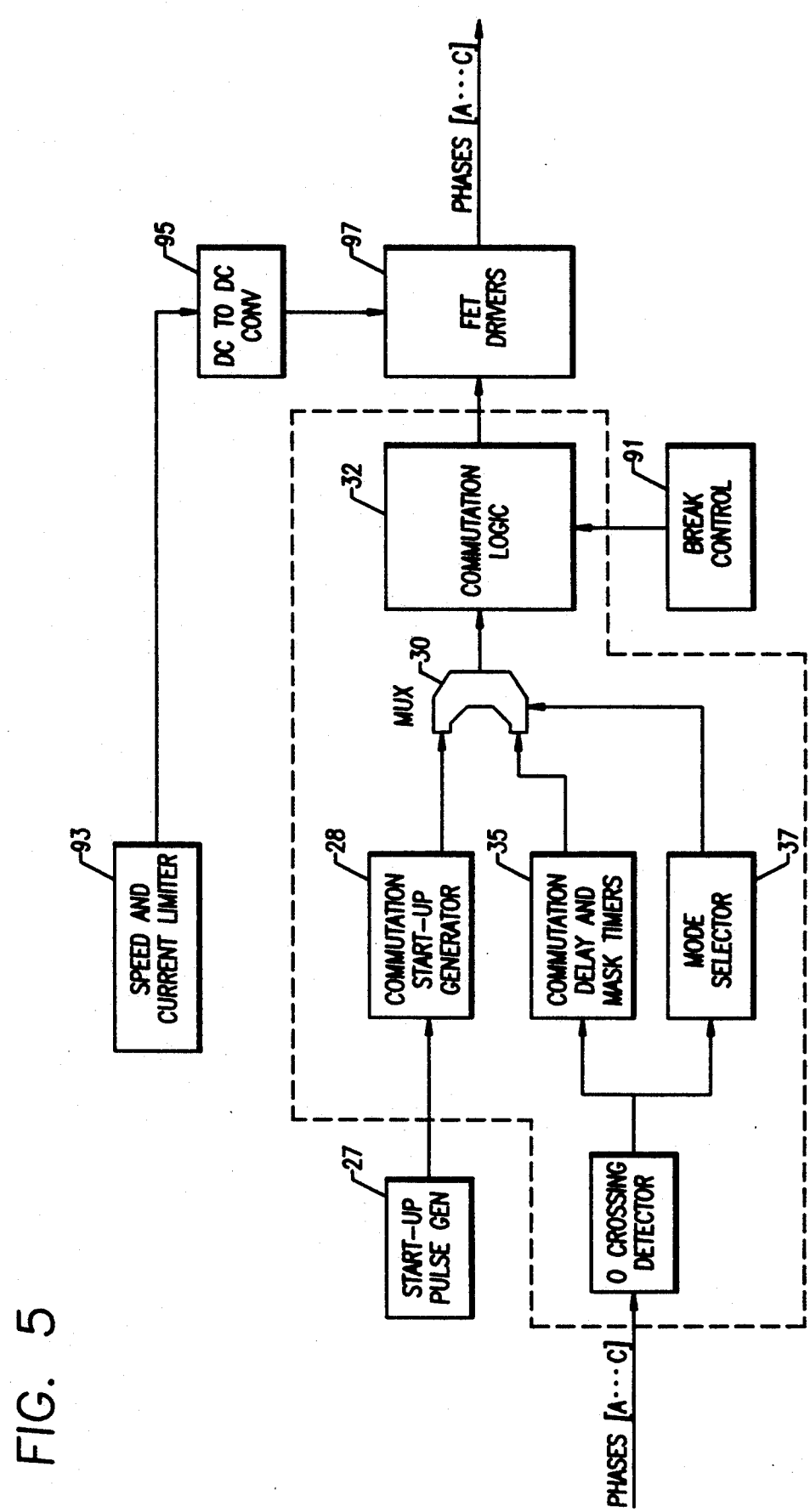
FIG. 5 is a block diagram showing the operational blocks of an implementation of the present invention.

FIG. 5 shows the operational blocks of a complete control system for a brushless DC motor. The motor is preferably of the type shown in FIG. 3 and described in the specification of U.S. Pat. No. 4,739,427 which issued Apr. 19, 1988 assigned to the assignee of the present invention, and incorporated herein by reference. The blocks within the dashed line represent the exemplary circuitry which has been previously discussed.

Referring to FIG. 5, the start-up pulse generator 27 generates a pulse which initializes the commutation start-up generator 28 and initiates operation of the system. Break control 91 controls deceleration of the motor. The speed and current limiter 93 controls the amount of current applied to the phases and is involved in maintaining the motor's speed at a desired level. The DC to DC converter 95 is used for controlling and generating the current applied to the phases. The drives 97 are preferably FET drivers to which phase current is supplied.

FIG. 6 shows the relative timing of the various signals which have been discussed above during the start-up phase of the motor energization. Initially, the commutation start-up generator 28 generates a start tach pulse (labeled start tach in FIG. 6). The start tach pulse is received by the mode detector 36. When the mode detector 36 receives a start tach pulse it indicates that the system is in start-up mode and the mode detector 36 generates the start select signal (labeled start sel in FIG. 6). The start select signal is received by the multiplexor 30. Receipt of the start select signal by the multiplexor 30 sets the multiplexor such that it ignores the input received from the latch 22 and instead accepts input from the commutation start-up generator 28.

When the start-up tach pulse is generated, the delay time generated by the commutation delay timer 34 begins to run (delay time signal low). At the end of the delay time, the next sequential phase of the motor is energized while the mask signal is generated by the mask timer (the compliment of the mask signal mask is shown in FIG. 6). The purpose of the delay is to allow the rotor to move from where the back EMF zero-crossing was detected to where the next phase should be energized. The mask signal also initiates draining of the capacitor in the start RC circuit down to zero. At the end of the mask period (the mask period is the time when mask/ signal is in its low state), the start RC circuit again begins charging. If no zero-crossing is detected, the start RC circuit will charge to its 5 volt maximum which will cause another start tach pulse to be generated which will start the sequence over again for the next phase of the motor in sequence.

When a back EMF signal is detected, the system enters "start-up mode under 300 rpm". When a back EMF zero-crossing occurs, the difference detector generates a diff signal (labeled diff in FIG. 6). That signal is received by the mode detector 36 which then sets the start select signal to its low level indicating that the system is no longer in start-up mode.

FIG. 7 shows the relative timing of the various signals in run mode below 300 rpm and during the transition from run mode below 300 rpm to run mode above 300 rpm. In FIG. 7 the state of the signals sense A/, sense B/, sense C is shown. The changes in valve or state of signal sense A/, sense B/ and sense C, as shown in FIG. 7, corresponds to the detection of a back EMF zero-crossing which causes the diff signal to be set to its high level.

The start RC signal indicates the level of charge in the start RC circuit. In "run mode below 300 rpm, the start RC signal starts from zero (not shown in FIG. 7) and after it reaches 4.3 volts, but before reaching 5 volts, a back EMF zero-crossing is detected which halts the charging of the start RC circuit. If the start RC circuit had reached the 5 volt level, a start tack signal would have been generated and the system would be in start-up mode which was discussed with reference to FIG. 6.

When the diff signal goes high (indicating that a back EMF zero-crossing has been detected), the delay time begins to run. At the end of the delay time the mask signal (the mask/ signal is shown in FIG. 7) goes high to mask out any spurious signals which occur during the initial powering of the next phase which might create a false back EMF detection which would incorrectly generate a diff signal. When the mask signal goes high, that initiates the rapid discharge of the start RC circuit down to zero. At the same time, the mask signal is generated, the latch signal is also generated which latches the new state or valves into the latch 22. When the mask signal is generated to mask out any spurious back EMF detections, the diff signal is also reset.

The state present in the latch 22 then passes through the multiplexor 30 onto the commutation logic 32 which causes the next phase in sequence to be energized. The state present at the signals S1, S2, S3 is always behind the state present on the sense signals sense A/, sense C, sense B/ by the amount of the delay time.

At the 300 rpm level and above, the phases are beginning to change so rapidly that the start RC circuit will not have sufficient time to reach a level of 4.3 volts. When a back EMF zero-crossing is detected prior to the start RC circuit charging to the 4.3 volt level, the system uses a second shorter mask period.

In view of the above teachings, many modifications and variations of the present invention are naturally possible by those skilled in the art. Therefore, it is to be understood that within the scope of the appended claims, the present invention may be practiced otherwise than as specifically described and shown herein.

What is claimed is:

1. An apparatus for controlling the rotation of a brushless DC motor having multiple stator windings related as phases and a permanent magnet rotor, said apparatus comprising:

stator current control means coupled to the stator windings for selectively applying current to selected phases in response to control signals;

sensing means coupled to the stator windings for producing a sense signal when a back-EMF zero-crossing occurs in one of said phases; and circuit means coupled to the sensing means and coupled to the stator current control means for supplying the control signals to the stator current control means in a manner to cause current to flow through said phases to produce rotation of the rotor, said circuit means further including delay means incorporating at least one resistor-capacitor time constant circuit for interposing a delay between receipt of a sense signal from the sensing means indicating a back EMF zero-crossing in one of said phases of the motor and the circuit means sending a control signal to the stator control means to cause the application of current to a next phase in sequence from said phase in which said back EMF zero-crossing was detected, such that said delay has a duration proportional to the amount of time current was applied to said phase in which said back-EMF zero-crossing was detected, said duration of said delay being set by the charge and discharge of at least one resistor-capacitor time constant circuit, wherein one of said resistor-capacitor circuits charges during the application of current to said phase in which said back-EMF zero-crossing was detected, and further wherein said duration of said delay is substantially equivalent to a discharge time of said resistor-capacitor circuit, said circuit means providing a discharge time having a shorter duration than said charging time.

2. The apparatus of claim 1 further including mask means for blocking the sense signal as current is initially applied to each phase to block out false back EMF zero-crossing signals which might be caused by transient voltages as current is initially applied to a phase, said mask means providing a signal with one of a number of fixed periods, and means for selecting one of said fixed periods by reference to the charging time of a resistor-capacitor time constant circuit.

3. The apparatus of claim 1 further including start-up generator means for generating the control signals to initiate movement of the rotor by applying current to each of the phases in sequence prior to the detection by the sensing means of a back EMF zero-crossing in one of the phases, and means for controlling the energization and de-energization of said start-up generator means by reference to the charging time of a resistor-capacitor time constant circuit.

4. The apparatus of claim 1 further including mask means for blocking the sense signal as current is initially applied to each phase to block out false back EMF zero-crossing signals which might be caused by transient voltages as current is initially applied to a phase, said mask means using the expiration of the delay time signal to directly trigger the application of the masking signal.

5. An apparatus for controlling the rotation of a brushless DC motor having multiple stator windings related as phases and a permanent magnet rotor, said apparatus comprising:

stator current control means coupled to the stator windings for selectively applying current to selected phases in response to control signals;

sensing means coupled to the stator windings for producing a sense signal when a back-EMF zero-crossing occurs in one of said phases;

circuit means coupled to the sensing means and coupled to the stator current control means for supplying the control signals to the stator current control means in a manner to cause current to flow through said phases to produce rotation of the rotor, said circuit means further including delay means incorporating at least one resistor-capacitor time constant circuit for interposing a delay between receipt of a sense signal from the sensing means indicating a back EMF zero-crossing in one of said phases of the motor and the circuit means sending a control signal to the stator control means to cause the application of current to a next phase in sequence from said phase in which said back EMF zero-crossing was detected, such that said delay has a duration proportional to the amount of time current was applied to said phase in which said back-EMF zero-crossing was detected, said duration of said delay being set by the charge and discharge of at least one resistor-capacitor time constant circuit, wherein one of said resistor-capacitor circuits charges during the application of current to said phase in which said back-EMF zero-crossing was detected, and further wherein said duration of said delay is substantially equivalent to a discharge time of said resistor-capacitor circuit, said circuit means providing a discharge time having a shorter duration than said charging time;

mask means for blocking the sense signal as current is initially applied to each phase to block out false back EMF zero-crossing signals which might be caused by transient voltages as current is initially applied to a phase, said mask means providing a masking signal with one of a number of fixed periods, and means for selecting one of said fixed periods by reference to the charging time of a resistor-capacitor time constant circuit, wherein said mask means use the expiration of said delay to directly trigger the application of said masking signal; and start-up generator means for generating the control signals to initiate movement of said rotor by applying current to each of said phases in sequence prior to the detection by the sensing means of a back EMF zero-crossing in one of said phases, and means for controlling the energization and de-energization of said start-up generator means by reference to the charging time of a resistor-capacitor time constant circuit.

* * * * *